United States Patent
Koch et al.

(10) Patent No.: US 11,150,406 B2
(45) Date of Patent: Oct. 19, 2021

(54) OPTICALLY ACTIVE WAVEGUIDE AND METHOD OF FORMATION

(71) Applicant: Quintessent, Goleta, CA (US)

(72) Inventors: Brian Koch, Goleta, CA (US); Michael Davenport, Santa Barbara, CA (US); Alan Liu, Santa Barbara, CA (US)

(73) Assignee: Quintessent Inc., Goleta, CA (US)

( * ) Notice: Subject to any disclaimer, the term of this patent is extended or adjusted under 35 U.S.C. 154(b) by 0 days.

(21) Appl. No.: 16/746,565

(22) Filed: Jan. 17, 2020

(65) Prior Publication Data

US 2021/0215875 A1    Jul. 15, 2021

Related U.S. Application Data

(60) Provisional application No. 62/961,348, filed on Jan. 15, 2020.

(51) Int. Cl.
*G02B 6/12*    (2006.01)
*G02B 6/122*   (2006.01)
(Continued)

(52) U.S. Cl.
CPC ....... *G02B 6/1228* (2013.01); *G02B 6/12004* (2013.01); *G02B 6/131* (2013.01); *G02B 6/136* (2013.01); *G02B 2006/12102* (2013.01); *G02B 2006/12107* (2013.01); *G02B 2006/12121* (2013.01); *G02B 2006/12123* (2013.01)

(58) Field of Classification Search
CPC .......................... G02B 6/1228; G02B 6/12004
See application file for complete search history.

(56) References Cited

U.S. PATENT DOCUMENTS 6,411,764 B1    6/2002  Lee
8,380,033 B1    2/2013  Fang et al.
(Continued)

OTHER PUBLICATIONS

G. Allen Vawter et al., "Tapered Rib Adiabatic Following Fiber Couplers in Etched GaAs Materials for Monolithic Spot-Size Transformation", "IEEE Journal of Selected Topics in Quantum Electronics", Dec. 1, 1997, pp. 1361-1371, vol. 3, No. 6.
(Continued)

*Primary Examiner* — Charlie Y Peng
(74) *Attorney, Agent, or Firm* — Kaplan Breyer Schwarz, LLP

(57) ABSTRACT

Integrated-optics systems are presented in which an active-material stack is disposed on a coupling layer in a first region to collectively define an OA waveguide that supports an optical mode of a light signal. The coupling layer is patterned to define a coupling waveguide and a passive waveguide, which are formed as two abutting, optically coupled segments of the coupling layer. The lateral dimensions of the active-material stack are configured to control the shape and vertical position of the optical mode at any location along the length of the OA waveguide. The active-material stack includes a taper that narrows along its length such that the optical mode is located completely in the coupling waveguide where the coupling waveguide abuts the passive waveguide. In some embodiments, the passive layer is optically coupled with the OA waveguide and a silicon waveguide, thereby enabling light to propagate between them.

37 Claims, 10 Drawing Sheets

(51) Int. Cl.
*G02B 6/136* (2006.01)
*G02B 6/13* (2006.01)

(56) References Cited

U.S. PATENT DOCUMENTS

| | | |
|---|---|---|
| 8,620,164 B2 | 12/2013 | Heck et al. |
| 8,767,792 B2 | 7/2014 | Bowers et al. |
| 9,097,848 B2 | 8/2015 | Bowers |
| 9,285,540 B2 | 3/2016 | Bauters et al. |
| 9,910,220 B2 | 3/2018 | Bowers |
| 10,444,433 B1 * | 10/2019 | Bian .................. G02B 6/136 |
| 2003/0086654 A1 * | 5/2003 | Saini .................. G02B 6/1228 385/50 |
| 2004/0052480 A1 * | 3/2004 | Benzoni ............... G02B 6/4279 385/94 |
| 2006/0285797 A1 * | 12/2006 | Little .................. G02B 6/1228 385/43 |
| 2015/0146755 A1 | 5/2015 | Kim et al. |
| 2015/0226918 A1 | 8/2015 | Bauters et al. |
| 2016/0131842 A1 | 5/2016 | Mahgerefteh et al. |
| 2017/0023734 A1 * | 1/2017 | Chiu ....................... G02B 6/12 |
| 2020/0174194 A1 * | 6/2020 | Kojima ............. G02B 6/29323 |

OTHER PUBLICATIONS

Sören Dhoore et al., "Novel adiabatic tapered couplers for active Iii-Visi devices fabricated through transfer printing", "Optics Express", Jun. 6, 2016, DOI:10.1364/OE.24.012976, pp. 12976-12990, vol. 24, No. 12.
Notice of Allowance and Fees Due (PTOL-85) dated Feb. 19, 2021 for U.S. Appl. No. 16/746,400.

* cited by examiner sectional view through c-c sectional view through d-d

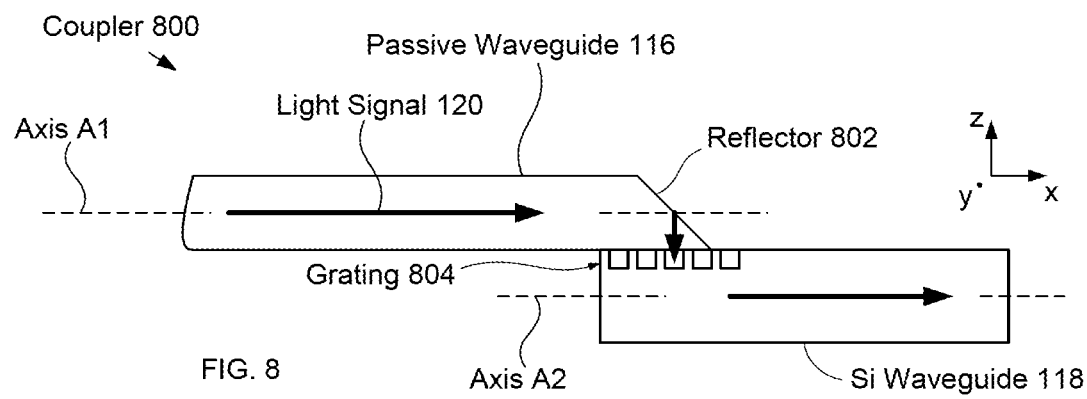
FIG. 8
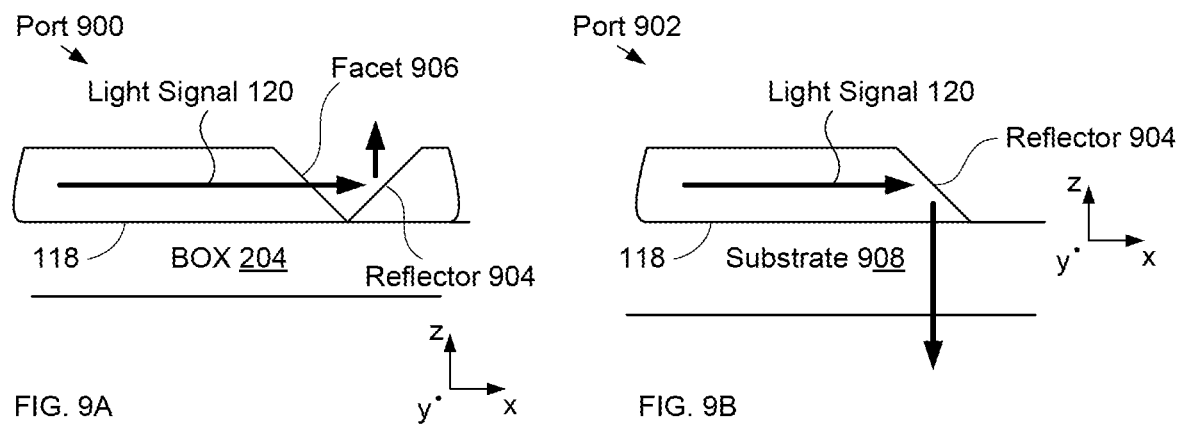
FIG. 9A
FIG. 9B

OPTICALLY ACTIVE WAVEGUIDE AND METHOD OF FORMATION

CROSS REFERENCE TO RELATED APPLICATIONS

This application is claims priority to U.S. Provisional Patent Application Ser. No. 62/961,348, filed Jan. 15, 2020, entitled "System Comprising an Integrated Waveguide-Coupled Optically Active Device and Method of Formation," (Attorney Docket 3218-001PR1), which is incorporated by reference. If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to integrated-optics and photonic integrated circuits in general, and, more particularly, to the integration of compound-semiconductor active and passive photonic elements, active electronic devices, and/or active and passive photonic devices.

BACKGROUND

Integrated optics promises relatively low-cost solutions for many photonic applications; however, the cost and complexity associated with formation of integrated-optics systems can be significant, which has limited their use in some applications. A movement toward silicon-based integrated optics has been driven, in part, by a desire to reduce cost and enable more system integration on a common substrate. Unfortunately, providing optically active functionality, such as on-chip light generation, amplification, modulation, etc., remains challenging.

Efforts toward providing such on-chip capabilities have been directed primarily toward the addition of compound-semiconductor material onto a substrate containing silicon waveguides and promising results have been achieved by direct bonding compound-semiconductor material on a substrate and subsequently patterning the material to form active compound-semiconductor devices above silicon waveguides on the substrate.

Alternatively, hetero-epitaxial growth has been employed to directly grow compound-semiconductor material on a substrate comprising silicon-based planar lightwave circuitry. After its growth, this material is processed in substantially conventional fashion to realize an optically active device that is optically coupled with at least one of the silicon waveguides.

In some other alternative conventional approaches, discrete optically active devices (e.g., lasers, amplifiers, modulators, etc.) are completely formed separately and optically coupled with a photonic integrated circuit (PIC) through, for example fiber coupling the device and the PIC, flip chip bonding the device onto the PIC substrate and optically coupling it with a silicon waveguide on the PIC via a silicon grating coupler, or employing conventional packaging methods wherein light is coupled between the discrete device and a silicon waveguide on the PIC.

Unfortunately, it is often necessary to compromise the performance of one or both of the optically active device and the waveguides of an integrated-optics system in order to enable their integration on a common substrate. Furthermore, coupling such photonic systems to other optical elements (on or off the common substrate) with low loss has proven challenging and often requires exotic packaging methods that can be complex and cost-prohibitive.

A platform that enables cost-effective and reliable integration of optically active devices in an integrated-optics system in a cost-effective manner without compromising performance would be a significant advance in the state of the art.

SUMMARY

The present disclosure is directed toward integrated-optics systems that include an optically active device optically coupled with a compound semiconductor waveguide disposed on a silicon substrate or layer. Embodiments in accordance with the present disclosure are particularly well suited for use in distributed-feedback lasers, mode locked lasers, photonic integrated circuits, external-cavity mode locked lasers, loop-mediated isothermal amplification devices, and the like.

An advance is made over the prior art by forming an optically active waveguide on a substrate having a silicon surface, where the optically active waveguide includes an active-material stack disposed on a compound-semiconductor coupling layer that is disposed on the silicon surface. The optically active waveguide is wholly contained in a first region on the substrate. Within the first region, the coupling layer is configured to define a low-loss, passive waveguide at an interface between the first region and a second region, while the active-material stack is configured to force optical energy within the optically active waveguide to transition, preferably adiabatically, into the passive waveguide. As a result, embodiments in accordance with the present disclosure advantageously enable low-loss propagation of a light signal between the optically active waveguide and other optical elements, such as i. other regions on the substrate; or
   ii. other photonic components on the substrate; or
   iii. input and/or output ports on the substrate; or
   iv. silicon waveguides disposed on the substrate; or
   v. external devices and/or systems (e.g., optical fibers, bulk-optics elements, other photonic integrated circuits, etc.); or
   vi. any combination of i, ii, iii, iv, and v.

As is known in the prior-art, the integration of compound-semiconductor devices on silicon substrates can enable lower-cost optically active systems and devices because silicon substrates are larger and typically cheaper than compound-semiconductor substrates.

It is an aspect of the present disclosure that the teachings herein provide additional advantages over the prior art because they enable designs of the active-material stack and the passive waveguide to be substantially independent; therefore, the functionality of each need not be compromised to enable their integration. This reduces the required complexity of fabrication, optical-coupling approaches. It also enables better coupling efficiency between the optically active waveguide and other optical elements that can be achieved for prior-art compound-semiconductor lasers on silicon. Furthermore, these advantages are derived while maintaining the cost advantages associated with fabrication on a silicon substrate.

In addition, since silicon is more mechanically robust that most compound semiconductors, the use of a silicon substrate enables advanced packaging techniques (e.g., flip-chip bonding, wafer thinning, backside polishing, silicon optical bench approaches, etc.) that are difficult, if not impossible, to use for compound-semiconductor-substrate-based systems. Furthermore, silicon has low optical loss at the wavelengths of most compound-semiconductor active devices; therefore, optical paths can pass through a silicon substrate (which, itself, can include optical elements such as lenses, diffractive elements, etc.), which enables simpler optical packaging approaches. Still further, because light can pass through the silicon substrate with low loss, low-complexity hermetic packaging approaches can be used.

An illustrative embodiment is an optically active waveguide disposed on a silicon surface of a substrate, where the optically active device is wholly contained in an active region of the substrate. The optically active waveguide comprises an active-material stack disposed on and optically coupled with a compound-semiconductor layer that is configured to define a coupling waveguide under the active-material stack such that the active-material stack and coupling waveguide collectively define a quantum-dot laser. The compound semiconductor layer is further configured such that it extends beyond the active-material stack as a passive waveguide that further extends into an output-coupling region of the substrate in which an optionally included silicon waveguide resides. The passive waveguide and silicon waveguide are optically coupled via a coupler defined in the output-coupling region. As a result, the passive waveguide functions as a low-loss conduit through which optical energy generated in the optically active waveguide is optically coupled into the silicon waveguide.

In the active region, the active material is patterned to define a tapered region that defines a first coupler that facilitates transfer of optical energy generated in the laser structure into a light signal propagating in the coupling waveguide.

In the output-coupling region, the silicon device layer of the silicon-on-insulator substrate is patterned to define a silicon waveguide that functions as a single-mode waveguide for the light signal.

In a transition region that lies between and abuts each of the active and output-coupling regions, the coupling waveguide is patterned to define a single-mode passive waveguide for the light signal. No optically active material or electrical contacts are present in the transition region. The passive waveguide extends slightly into the output-coupling region, where it is tapered to define a second coupler that facilitates transfer of the light signal into the silicon waveguide.

In some embodiments, the silicon waveguide is not included and the passive waveguide functions as an optical interface to another optical element. In some embodiments, the other optical element and the optically active waveguide are disposed on the same substrate. In some embodiments, the other optical element is external to the substrate comprising the optically active waveguide. In some such embodiments, the passive waveguide is configured such that its optical mode is substantially matched with the optical mode of an external element to mitigate optical coupling loss.

In some embodiments, the coupling layer includes a lower sub-layer and an upper sub-layer, where the lower sub-layer is doped to facilitate forming electrical contacts. The upper sub-layer is characterized by a higher refractive index than the lower sub-layer, thereby enabling the lower sub-layer to also function as a lower cladding layer.

In some embodiments, the optically active device is a device other than a laser, such as an optical modulator (e.g., an electroabsorption modulator, a phase modulator, etc.), an optical amplifier, a variable optical attenuator, a photodetector, and the like. In some embodiments, the optically active device includes a quantum element other than a quantum dot, such as a quantum dash, quantum well, a quantum wire, and the like. In some embodiments, optically active device does not include a quantum element.

In some embodiments, the active region includes an optically active device and coupling layer of a different compound semiconductor, such as indium phosphide, indium gallium arsenide phosphide, and the like. As a result, the passive waveguide also comprises this different compound semiconductor.

In some embodiments, a reflector is defined in at least one of the passive and silicon waveguides to redirect a light signal. In some embodiments, the reflector is defined in the passive waveguide and is configured to optically couple with a vertical grating coupler defined in the silicon waveguide. In some embodiments, the reflector is configured to redirect the light signal such that it propagates through the substrate. In some such embodiments, an optical element (e.g., a lens, diffraction grating, etc.) is defined at a surface of the substrate along the optical path of the light signal.

In some embodiments, an alignment feature is included for passively aligning a bulk optical element (e.g., an optical fiber, a photodetector, a light source, etc.), to one of the passive and silicon waveguides. In some such embodiments, this alignment feature is a silicon-optical-bench feature.

In some embodiments, a spot-size converter is included in the passive waveguide and/or the silicon waveguide to facilitate optical coupling with an external element.

An embodiment in accordance with the present disclosure is an integrated-optics system disposed on a first substrate, the system comprising: an optically active (OA) waveguide disposed on a first layer in a first region, the first layer comprising single-crystal silicon, wherein the OA waveguide is wholly located in the first region and includes: (i) an active-material stack having a first lateral dimension; and (ii) a coupling waveguide having a second lateral dimension, the coupling waveguide including a first segment of a coupling layer that comprises a compound semiconductor; wherein the active-material stack and the coupling waveguide collectively support at least a portion of an optical mode of a light signal, and wherein at least one of the shape and vertical position of the optical mode at each location within the first region is based on at least one of the first lateral dimension and the second lateral dimension at that location; and a first waveguide that is a passive waveguide, the first waveguide being located in a second region and being configured to support at least a portion of the optical mode, wherein the first waveguide has a first core that comprises a second segment of the coupling layer, and wherein the second segment abuts the first segment; wherein the OA waveguide and the first waveguide are optically coupled.

Another embodiment in accordance with the present disclosure is a method for forming an integrated-optics system on a first substrate, wherein the method includes: forming an optically active (OA) waveguide disposed on a first layer in a first region, the first layer comprising single-crystal silicon, wherein the OA waveguide comprises: (i) a coupling waveguide that includes a first segment of a coupling layer that comprises a compound semiconductor; and (ii) an active-material stack that is disposed on the coupling waveguide such that the active-material stack and the coupling waveguide collectively support at least a portion of an optical mode of a light signal; wherein, at each location within the first region, the active-material stack has a first lateral dimension and the coupling waveguide has a second lateral dimension; and wherein at least one of the shape and vertical position of the optical mode at each location within the first region is based on at least one of the first width and the second width; and forming a first waveguide in a second region, wherein the first waveguide is a passive waveguide configured to support at least a portion of the optical mode, and wherein the first waveguide has a first core that comprises a second segment of the coupling layer, and further wherein the second segment abuts the first segment such that the first waveguide is optically coupled with the first OA waveguide.

BRIEF DESCRIPTION OF THE DRAWINGS

FIG. 8 depicts a schematic drawing of a cross-sectional view of yet another alternative coupler in accordance with the present disclosure.

FIGS. 9A and 9B depict schematic drawings of cross-sectional views of alternative output ports in accordance with the present disclosure.

DETAILED DESCRIPTION

For the purposes of the present disclosure, including the appended claims, the following terms are defined:
"disposed on" or "formed on" is defined as is defined as "exists on" an underlying material or layer with or without intermediate layers. For example, if a material is described to be "disposed (or grown) on a substrate," this can mean that either (1) the material is in intimate contact with the substrate; or (2) the material is in contact with one or more layers that reside on the substrate.

optically active device is defined as an electrically coupled device (i.e., a device comprising electrical contacts for connecting to external circuitry) in which, in response to an electrical signal applied to the electrical contacts, either (a) photons are generated due to the recombination of free carriers or (b) free-carrier pairs are generated due to the absorption of photons. Examples of optically active devices include, without limitation, lasers, optical amplifiers, optical modulators (e.g., electroabsorption modulators, phase modulators, etc.), variable optical attenuators, photodetectors, and the like. It should be noted that an optically active device does not require inclusion of a quantum-element-containing layer.

quantum element is defined as a semiconductor structure that exhibits a quantum effect. Examples of quantum elements include, without limitation, quantum dots, quantum wells, quantum-well layers, quantum dashes, quantum wires, and the like.

passive waveguide is defined as a surface waveguide in which light passes through virtually unperturbed. Passive waveguides are not operatively coupled with electrical contacts and are not stimulated to exhibit optoelectronic effects, such conversion of free carriers into photons or vice versa, optical modulation, optical amplification, and the like.

For the purposes of this Specification, including the appended claims, the terms "lateral" and "vertical" as used are meant to be relative to the major surfaces of a substrate on which an integrated-optics system resides, where the term lateral refers to directions that are parallel to the major surfaces and the term vertical refers to directions that are normal to the major surfaces. In similar fashion, the term "lower" means more proximate to the substrate and the term "higher" means more distal from the substrate.

Figure 1:
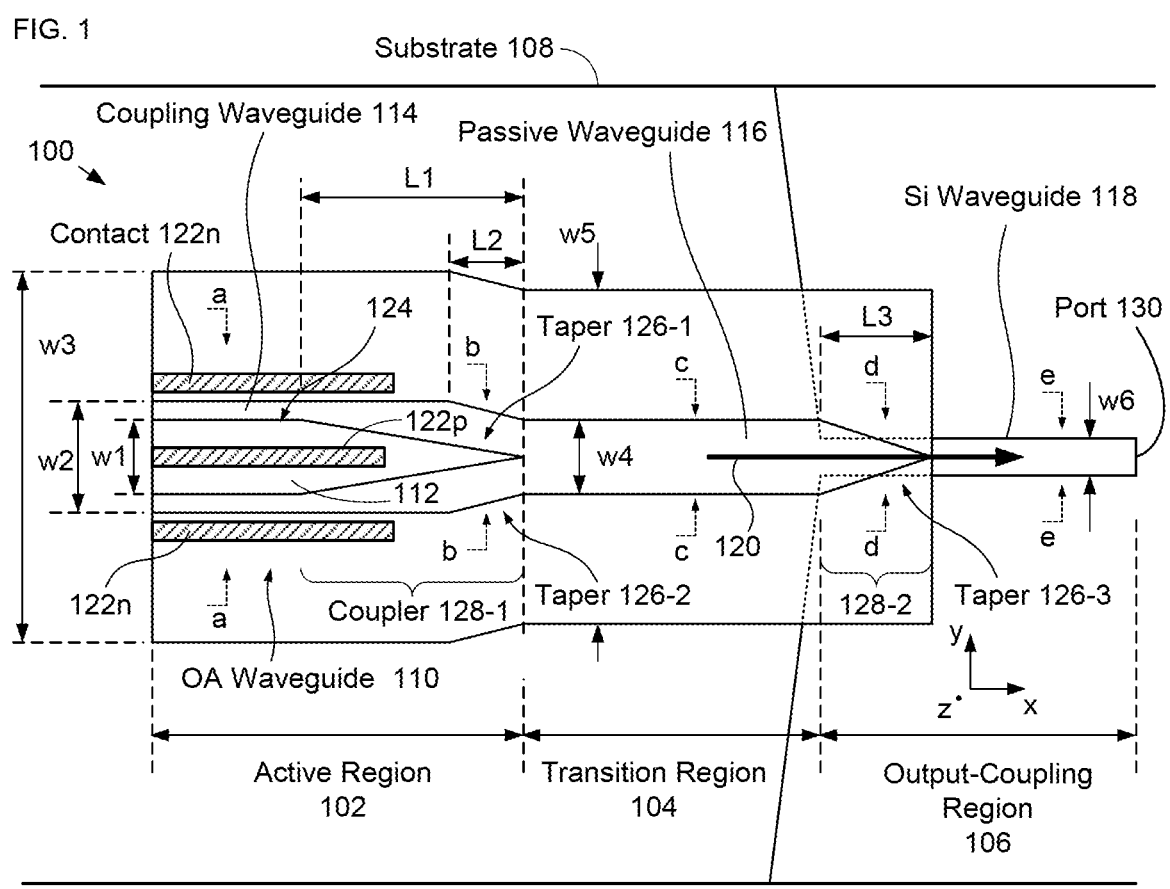
FIG. 1 depicts a schematic drawing of a top view of an illustrative integrated-optics system in accordance with the present disclosure.

FIG. 1 depicts a schematic drawing of a top view of an illustrative integrated-optics system in accordance with the present disclosure. System 100 includes active region 102, transition region 104, and output-coupling region 106, which are disposed on substrate 108. Active region 102, transition region 104, and output-coupling region 106 are contiguous regions that collectively define an integrated-optics-based, silicon-waveguide-coupled laser. System 100 comprises optically active (OA) waveguide 110, coupling waveguide 114, passive waveguide 116, and optional silicon waveguide 118, which are arranged such that optical energy generated by OA waveguide 110 propagates as light signal 120 from the active region 102 to port 130.

It should be noted that, although the illustrative embodiment is an integrated-optics-based, silicon-waveguide-coupled laser wherein a light signal propagates from an OA waveguide to a waveguide port, in some embodiments, a light signal propagates from a waveguide port to an OA waveguide. Furthermore, in some embodiments, no silicon waveguide is included and port 130 is located in passive waveguide 116. Furthermore, in some embodiments, more than one passive waveguide and/or silicon waveguide is included.

FIGS. 2A-E depict schematic drawings of sectional views of system 100 through lines a-a through e-e, respectively.

Figure 3:
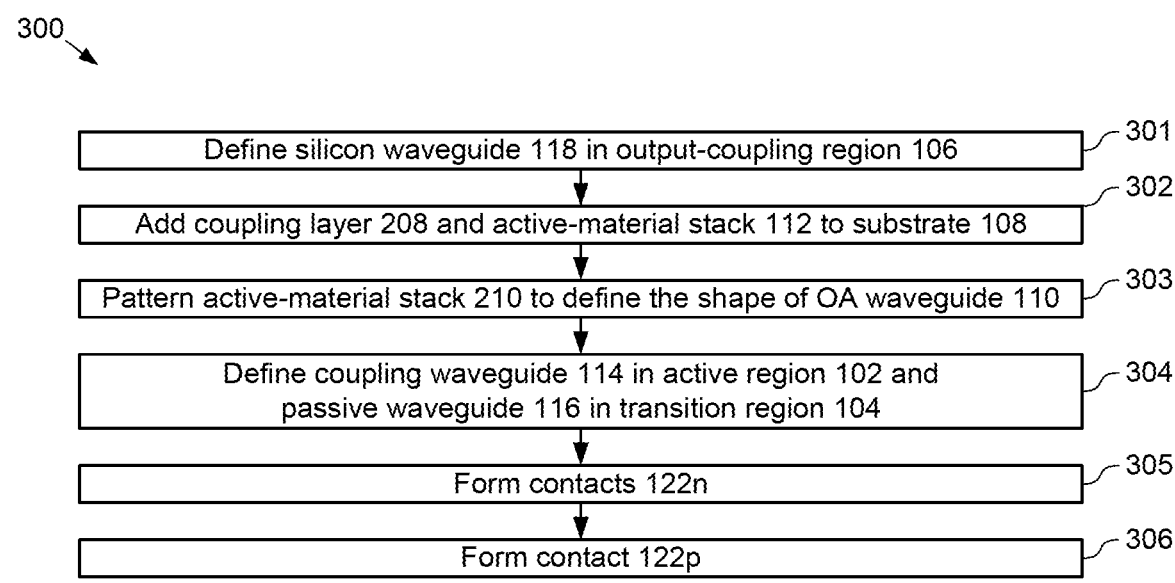
FIG. 3 depicts operations of a method suitable for forming system 100 in accordance with the illustrative embodiment.

FIG. 3 depicts operations of a method suitable for forming system 100 in accordance with the illustrative embodiment. Method 300 is described with continuing reference to FIGS.

1 and 2A-E. Method 300 begins with operation 301, wherein silicon waveguide 118 is defined on substrate 108 in output-coupling region 106.

Substrate 108 is a conventional silicon-on-insulator (SOI) substrate comprising handle substrate 202, buried oxide layer (BOX) 204, and silicon device layer 206. In the depicted example, handle substrate 202 is a conventional silicon wafer, BOX 204 is a layer of thermally grown silicon dioxide having a thickness that is typically within the range of approximately 1-2 microns and, preferably, 2 microns, and silicon device layer 206 is a layer of single-crystal silicon having a thickness equal to approximately 220 nm. As will be apparent to one skilled in the art after reading this Specification, however, substrate 108 can be any substrate suitable for use in system 100. Examples of substrates suitable for use in accordance with the present disclosure include, without limitation, glass substrates, compound-semiconductor substrates, bulk-silicon substrates, and the like.

Silicon waveguide 118 is a rib waveguide having a rib portion of width w6. In output-coupling region 106, silicon waveguide is configured enable the waveguide to support single-mode propagation of light signal 120. Silicon waveguide 118 is formed by patterning silicon device layer 206 via conventional lithography and etching to define its structure. In some embodiments, silicon waveguide 118 has a waveguide structure other than that of a rib waveguide, such as a channel waveguide, strip waveguide, ridge waveguide, etc.

At operation 302, coupling layer 208 and active-material stack 112 are added to substrate 108.

In the depicted example, heterogeneous integration techniques are used to add coupling layer 208 and active-material stack 112 to substrate 108. Heterogeneous-integration techniques suitable for use in accordance with the present disclosure are described in, for example, U.S. Pat. Nos. 9,097,848, 9,910,220, 8,380,033, 8,620,164, each of which is incorporated herein by reference in their entirety.

In accordance with conventional hybrid-silicon integration, a separate photonic substrate is formed by epitaxially growing active-material stack 112 and coupling layer 208 on a sacrificial substrate.

Figure 4A:
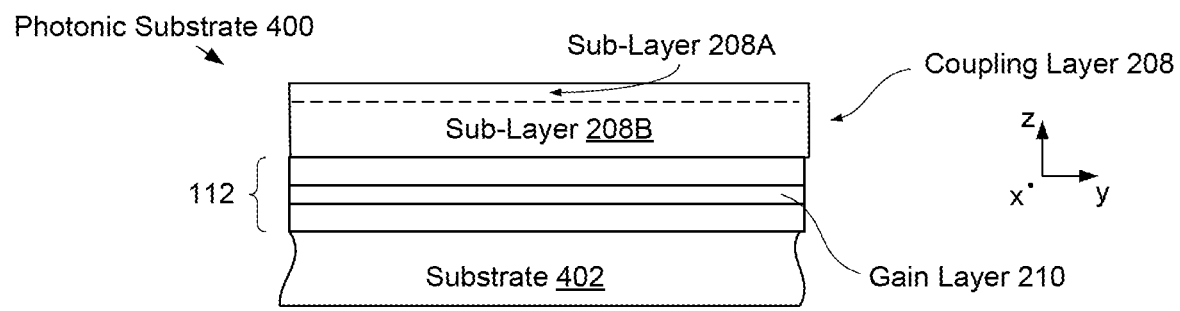
FIG. 4A depicts a cross-sectional drawing of a portion of a sacrificial substrate comprising coupling layer 208 and active-material stack 112.

FIG. 4A depicts a schematic drawing of a cross-sectional view of a portion of a photonic substrate in accordance with the illustrative embodiment. Photonic substrate 400 includes coupling layer 208 disposed on active-material stack 112, which is disposed on sacrificial substrate 402.

In the depicted example, sacrificial substrate 402 is a conventional gallium arsenide wafer and coupling layer 208 is a layer of gallium arsenide having a thickness suitable for supporting single-mode propagation of light signal 120. In some embodiments, at least one of sacrificial substrate 402 and coupling layer 208 comprises a compound semiconductor other than gallium arsenide, such as indium phosphide, indium gallium arsenide, indium gallium arsenide phosphide, and the like.

Preferably, coupling layer 208 comprises sub-layers 208A and 208B, where sub-layer 208A has a lower refractive index than that of sub-layer 208B. As a result, sub-layer 208A can function as a cladding layer that serves to substantially confine at least a portion of the optical mode of light signal 120 to sub-layer 208B as the light signal propagates through passive waveguide 116. In some embodiments, coupling layer 208 includes at least one additional sub-layer distal to sub-layer 208A, where this additional sub-layer or sub-layers are configured to function as an upper cladding for sub-layer 208B. In some embodiments, coupling layer 208 does not include sub-layers (i.e., it is a homogeneous layer).

Furthermore, in some embodiments, sub-layer 208A is doped to reduce contact resistance for contacts 122n.

In the depicted example, active-material stack 112 includes the constituent layers of a quantum-dot laser, including cladding layers, carrier confinement layers, and gain layer 210. In some embodiments, active-material stack 112 includes the constituent layers of a different optically active device, such as an optical modulator (e.g., an electroabsorption modulator, a phase modulator, etc.), an optical amplifier, a variable optical attenuator, a photodetector, and the like.

It should be noted that, although the illustrative embodiment includes a gain layer comprising a plurality of quantum dots, gain layer 210 can include any one or more of a wide variety of quantum elements without departing from the scope of the present disclosure. Quantum elements suitable for inclusion in gain layer 210 include, without limitation, quantum wells, quantum-well layers, quantum wires, quantum dashes, and the like.

In addition, as discussed below, preferably, active-material stack 112 also includes sub-layers having different refractive indices to control the vertical position of optical mode 214. For example, in some embodiments, active-material stack 112 contains higher aluminum content with gallium arsenide in the layers between active layer 210 and its top contact layer. This provides a lower index of refraction that can force optical energy in an optical mode within the material stack downward toward coupling waveguide 114. Furthermore, defining the active-material stack as a ridge or rib also helps force the optical mode toward the coupling waveguide while serving to laterally contain the optical mode as well.

In some embodiments, a dielectric layer is included between coupling layer 208 and silicon device layer 206 to act as a lower cladding that confines the optical mode toward at least one of the middle portion of passive waveguide 116 and the middle portion of active-material stack 112.

In some embodiments, active-material stack 112 also includes a region between active layer 210 and coupling waveguide 114 that has higher aluminum content to create a lower index of refraction, thereby forcing the optical mode upward away from the coupling waveguide. It should be noted that this same layer can also function as an upper cladding for coupling waveguide 114.

Once active-material stack 112 and coupling layer 208 are complete, photonic substrate 400 is then flipped over and coupling layer 208 is bonded to silicon device layer 206 via direct bonding. In some embodiments, a different bonding technology is used to join coupling layer 208 and device layer 206, such as plasma bonding, fusion bonding, thermo-anodic bonding, and the like. In some embodiments, an interface layer is included between silicon device layer 206 and coupling layer 208 to facilitate their bonding.

Once photonic substrate 400 and substrate 108 are bonded, sacrificial substrate 402 is removed in conventional fashion.

Figure 4B:
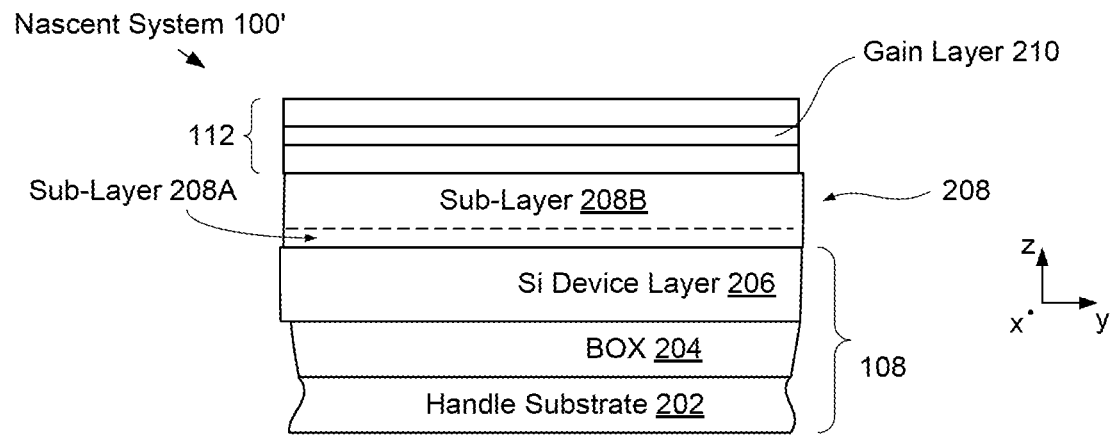
FIG. 4B depicts a cross-sectional view of nascent system 100 after coupling layer 208 and silicon device layer 206 have been bonded.

FIG. 4B depicts a schematic drawing of a cross-sectional view of nascent system 100' after the removal of sacrificial substrate 402.

Although in the depicted example, coupling layer 208 and active-material stack 112 are added to substrate 108 via heterogeneous bonding techniques, in some embodiments, they are epitaxially grown on the substrate. In such embodiments, coupling layer 208 is grown directly on silicon device layer 206 via hetero-epitaxial growth, which is followed by epitaxial growth of active-material stack 112 on the coupling layer.

Returning now to method 300, at operation 303, active-material stack 112 is patterned to define its lateral dimensions. It should be noted that this removes active material completely from each of transition region 104 and output-coupling region 106. As a result, optically active material is selectively included in active region 102. However, as will be apparent to one skilled in the art, after reading this Specification, in some embodiments, a substrate has multiple active regions, each containing corresponding patterns of active-material stack 112.

OA device 110 is patterned such that it has nominal width w1 outside of the area of coupler 128-1, where the value of w1 is selected to facilitate lateral confinement of light signal 120 in the active region. In the depicted example, w1 is equal to 2 microns; however, w1 can have any suitable value. Typically, w1 is within the range of approximately 0.5 micron to approximately 4 microns.

At operation 304, coupling layer 208 is patterned in conventional fashion to define coupling waveguide 114 in active region 102 and passive waveguide 116 in transition region 104, where the passive waveguide supports single-mode propagation of light signal 120. It should be noted, however, that in active region 102, coupling waveguide 114 is not typically a single-mode waveguide for light signal 120.

Coupling waveguide 114 is formed as a rib waveguide. Coupling waveguide 114 includes a central ridge portion having width w2 and a planar portion having width w3. In the depicted example, w2 and w3 are 6 microns and 100 microns, respectively; however, each of w2 and w3 can have any suitable value. Typically, the value of w2 is within the range of approximately 0.5 micron to 20 microns. As will be apparent to one skilled in the art, the value of w3 is not typically critical, but is normally within the range of 25 to 500 microns.

It should be noted that, after operation 304, active-material stack 112 and coupling waveguide 114 collectively define optically active (OA) waveguide 110 as a composite rib waveguide (also sometimes referred to as a strip waveguide), where the active-material stack functions as the projecting ridge portion of the composite waveguide and the central ridge portion of coupling waveguide 114 functions as the planar portion of the composite waveguide (i.e., the planar portion of coupling waveguide 114 is not functionally integral to OA waveguide 110).

In the depicted example, the width, w2, of coupling waveguide 114 is selected such that the coupling waveguide, itself, contributes little or no lateral confinement of optical mode 214 within active region 102. As a result, the shape and size of optical mode 214 in active region 102 is determined primarily by the lateral dimensions of active material stack 112. In some embodiments, however, coupling waveguide 114 has a width that enables the coupling waveguide to provide lateral confinement of the optical mode. In some embodiments, the width of coupling waveguide 114 is substantially equal to the width of active-material stack 112 (i.e., w2=w1 and the coupling waveguide is substantially a channel waveguide).

Passive waveguide 116 is also formed as a rib waveguide comprising a central ridge portion having width w4 and a planar region having width w5. In the depicted example, w4 and w5 are 2 microns and 10 microns, respectively; however, each of w4 and w5 can have any suitable value. Typically, the value of w4 is within the range of approximately 0.5 micron to 4 microns. As will be apparent to one skilled in the art, the value of w5 is not typically critical, but is normally within the range of 0.5 to 100 microns.

Since coupling waveguide 114 and passive waveguide 116 are continuous segments of coupling layer 208, they are inherently optically coupled.

At operation 304, contacts 122n are formed outside the central ridge portion of coupling waveguide 114.

At operation 305, contact 122p is formed on the top surface of active-material stack 112 to complete the formation of system 100.

It should be noted that, in some embodiments, coupling waveguide is a slab waveguide (i.e., no ridge and planar portions are defined in coupling layer 208 within active region 102). In such embodiments, contacts 122n can be formed on the top surface of the coupling layer, in vias partially etched down to sub-layer 208A, or in any manner suitable for making them operative coupled with OA waveguide 110. In some embodiments, coupling waveguide 114 is formed as a channel waveguide (i.e., no planar portion remains after coupling layer 208 has been etched to define the waveguide). In such embodiments, device layer is in electrical contact with sub-layer 208A and contacts 122n are formed in silicon device layer 206.

Upon completion of system 100, active region 102 selectively includes OA waveguide 110, output-coupling region 106 selectively includes silicon waveguide 118, and transition region 104 includes passive waveguide 116. Passive waveguide 116 also extends into active region 102 to form coupler 128-1 with coupling waveguide 114 and extends into output-coupling region 106 to form coupler 128-2 with silicon waveguide 118.

It is an aspect of the present invention that the lateral dimensions of active-material stack 112 substantially determine the vertical position at which optical energy in OA waveguide 110 forms an optical mode, as well as the shape of that optical mode. As a result, active material stack 112 is defined such that it includes a first segment (i.e., gain section 124) in which it is configured to favor optical gain that gives rise to an optical mode and a second segment (i.e., taper 126-1) that is configured to force the optical energy of that optical mode into coupling waveguide 114.

Figure 2A:
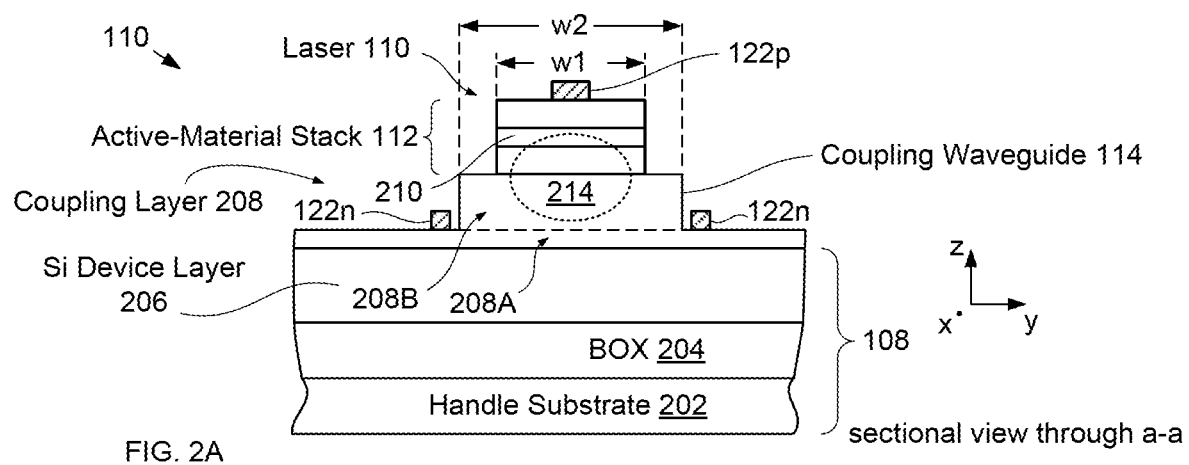
FIGS. 2A-E depict sectional views of system 100 through lines a-a through e-e, respectively.

FIG. 2A depicts a schematic drawing of a sectional view of OA waveguide 110 taken through gain section 124 (i.e., through line a-a shown in FIG. 1).

As seen in FIG. 2A, in gain section 124, the relative values of w1 and w2 give rise to optical mode 214 such that its optical energy is contained within one continuous region that is substantially centrally located in OA waveguide 110.

In some embodiments, coupling waveguide 114 and active-material stack 112 are configured such that optical mode 214 extends over a continuous region that includes at least a portion of each of the active-material stack, the coupling waveguide, and silicon device layer 206 (i.e., optical mode 214 is partially supported by each of the active-material stack, the coupling waveguide, and the silicon device layer).

Coupler 128-1 is a section of active region 102 configured for forcing substantially all of the optical energy of light signal 120 located in active-material stack 112 into coupling waveguide 114 so that it can efficiently couple into passive waveguide 116. Coupler 128-1 includes tapers 126-1 and 126-2.

Taper 126-1 is a segment of active-material stack 112 that is configured to force the optical energy of light signal 120 into coupling waveguide 114. Taper 126-1 has length L1 and a width that reduces from w1 to zero (i.e., extinction) along length L1. In the depicted example, L1 is equal to 100 microns; however, it is typically within the range of approximately 50 microns to approximately 500 microns. It should be noted that the value of L1 is a matter of design choice and, therefore, it can have any suitable value. Furthermore, in some embodiments, taper 126-1 does not taper to extinction but, rather, to a non-zero width (e.g., one micron or less) that is sufficiently narrow to force the optical energy of light signal 120 from active-material stack 112 into passive waveguide 116.

In similar fashion, taper 126-2 is a segment of coupling waveguide 114 that is configured to facilitate the transfer of light signal 120 into passive waveguide 116 as a single-mode signal. Taper 126-2 has length L2, over which the width of coupling waveguide 114 changes from w2 to w4 (i.e., the width of passive waveguide 116). In the depicted example, L2 is equal to 50 microns; however, it is typically within the range of approximately 10 microns to approximately 500 microns. It should be noted that the value of L2 is not critical and, therefore, it can have any value within a wide range.

Figure 2B:
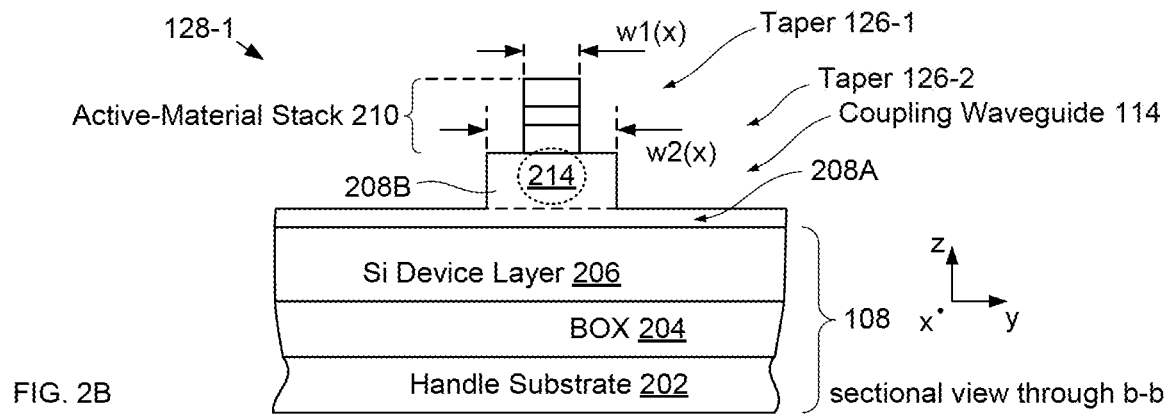

FIG. 2B depicts a schematic drawing of a sectional view of coupler 128-1 as taken through line b-b shown in FIG. 1.

As noted above, the distribution of the optical energy of optical mode 214 between active-material stack 112 and coupling layer 208 (i.e., the shape and vertical position of the optical mode) is based on the relationship of w1 and w2, which change along length L1 of taper 126-1. Tapers 126-1 and 126-2 are configured, therefore, to force optical mode 214 substantially completely into coupling waveguide 114 by the time light signal 120 reaches transition region 104.

In similar fashion, in the depicted example, w4 and w5 of passive waveguide 116 are selected such that optical mode 214 is substantially confined within its ridge and planar regions within transition region 104. In some embodiments, however, passive waveguide 116 is configured such that the optical energy of optical mode 214 extends across a continuous region that occupies at least portions of both passive waveguide 116 and silicon device layer 206. In other words, such that each of passive waveguide 116 and silicon device layer 206 partially supports optical mode 214.

Figure 2C:
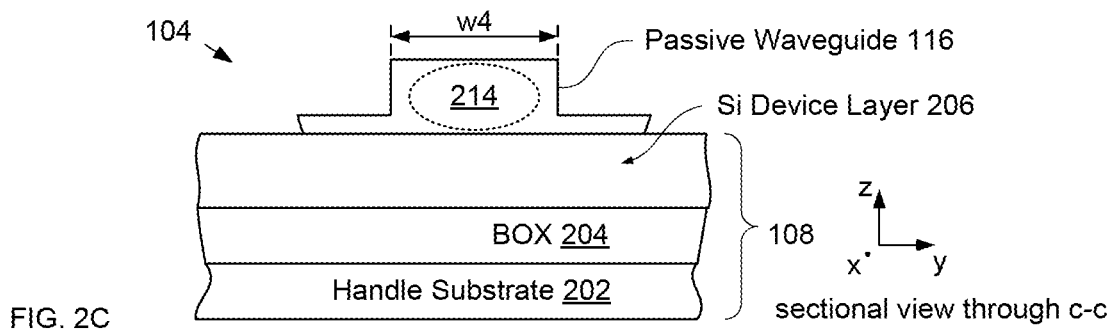

FIG. 2C depicts a schematic drawing of a sectional view of transition region 104 as taken through line c-c shown in FIG. 1.

Coupler 128-2 is a section of output-coupling region 106 configured for efficiently optically coupling light signal 120 from passive waveguide 116 into silicon waveguide 118. Coupler 128-2 includes taper 126-3 and a segment of silicon waveguide 118, where taper 126-3 is a segment of passive waveguide 116 that is configured to facilitate the transfer of light signal 120 into silicon waveguide 118 as a single-mode signal.

Figure 2D:
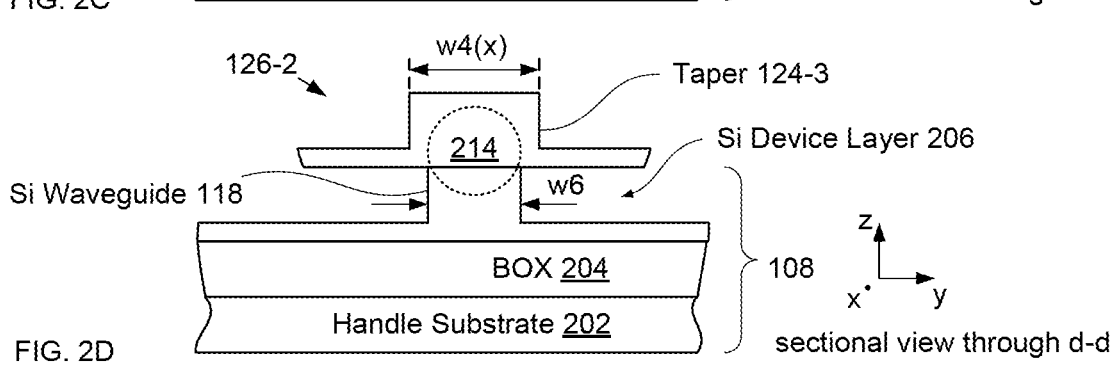

FIG. 2D depicts a schematic drawing of a sectional view of coupler 128-2 as taken through line d-d shown in FIG. 1. Note that the planar portion of silicon waveguide 118 is not shown in FIG. 1.

Taper 126-3 has length L3, over which the width of passive waveguide 116 changes from w4 to extinction. As a result, taper 126-3 is configured to force optical mode 214 completely into silicon waveguide 118. In the depicted example, L3 is equal to 200 microns; however, it is typically within the range of approximately 50 microns to approximately 1000 microns. It should be noted that the value of L3 is a matter of design choice and, therefore, it can have any suitable value. As discussed above and with respect to taper 126-1, in some embodiments, taper 126-3 does not taper to extinction but, rather, to a non-zero width (e.g., one micron or less) that is sufficiently narrow to force the optical energy of light signal 120 from passive waveguide 116 into silicon waveguide 118. Furthermore, in some embodiments, silicon waveguide 118 includes a taper that facilitates transfer of optical energy between the silicon and passive waveguides. In some embodiments, both passive waveguide 116 and silicon waveguide 118 include a taper.

Figure 2E:
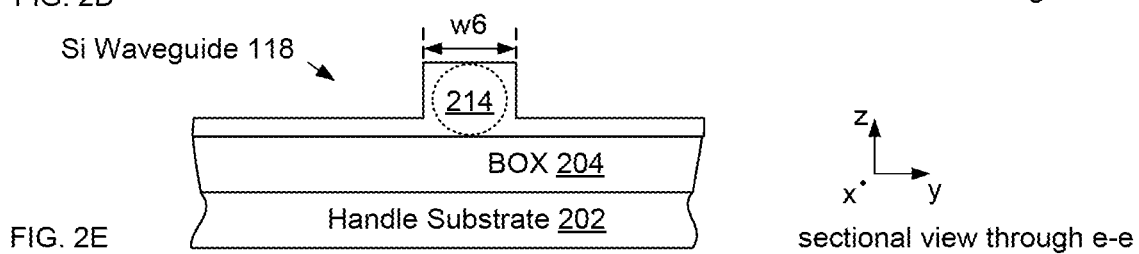

FIG. 2E depicts a schematic drawing of a sectional view of silicon waveguide 118 as taken through line e-e shown in FIG. 1. It should be noted that, in the depicted example, the regions between silicon waveguide 118 and taper 126-3 are air-cladding regions; however, these regions can be filled with any material suitable to function as cladding material for the silicon waveguide, such as silicon dioxide, silicon nitride, polymer, and the like.

It is another aspect of the present invention that OA waveguide 110 can be configured to support an optical mode that is discontinuous such that, at some points within active region 102, it includes separate optical-mode portions that propagate together but are distributed among active-material stack 112 and coupling waveguide 114 and, in some embodiments, silicon device layer 206. In other words, each of active-material stack 112, coupling waveguide 116 and silicon device layer 206 partially supports optical mode 214 by supporting a different one of its optical-mode portions.

Figure 5A:
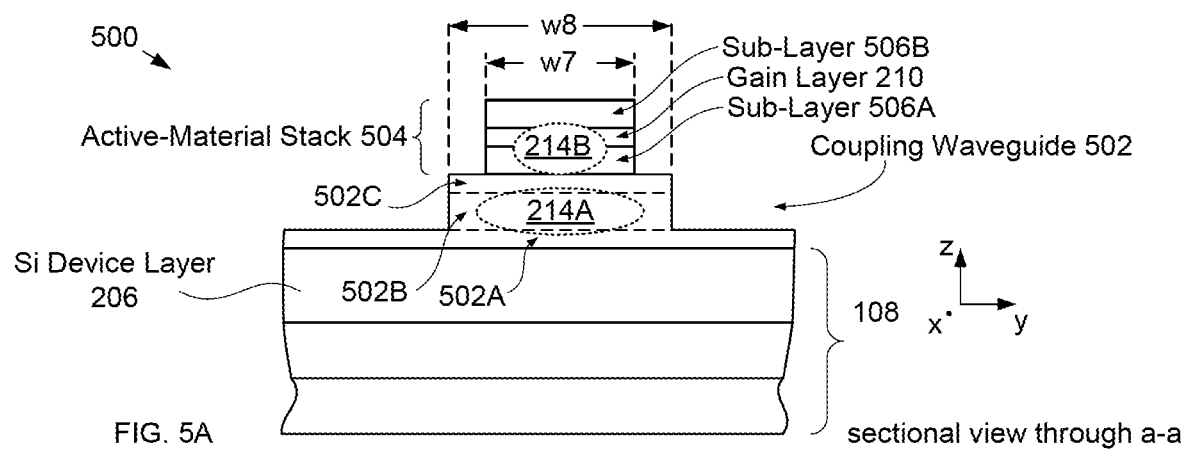
FIG. 5A depicts a schematic drawing of a sectional view of an alternative optically active waveguide in accordance with the present disclosure.

FIG. 5A depicts a schematic drawing of a sectional view of an alternative optically active waveguide in accordance with the present disclosure. The sectional view depicted in FIG. 5A is taken through a region analogous to that intersected by line a-a shown in FIG. 1. OA waveguide 500 includes substrate 108, coupling waveguide 502, and active-material stack 504. For clarity, electrical contacts are not shown in FIG. 5A.

In OA waveguide 500, coupling waveguide 502 and active-material stack 504 are configured such that each includes at least one sub-layer that is configured to force optical energy of optical mode 214 into a different sub-layer of that element. As a result, optical mode 214 is split into two discontinuous optical-mode portions—optical-mode portions 214A and 214B. In other words, each of coupling waveguide 502 and active-material stack 504 partially supports optical mode 214 by supporting a different one of optical-mode portions 214A and 214B.

Coupling waveguide 502 is analogous to coupling waveguide 114; however, coupling waveguide 502 has width w8 and includes sub-layers 502A, 502B, and 502C, where each of sub-layers 502A and 502C has a refractive index that is lower than that of sub-layer 502B. As a result, sub-layers 502A and 502C function as lower and upper cladding layers, respectively, that substantially confine the bulk of the optical energy of optical-mode portion 214A to sub-layer 502B.

Active-material stack 504 is analogous to active-material stack 112; however, active-material stack 504 has width w7 and includes sub-layers 506A and 506B, each of which has a refractive index that is higher than that of gain layer 210. As a result, sub-layers 506A and 506B function as upper and lower cladding layers, respectively, that substantially confine the bulk of the optical energy of optical-mode portion 214B to the portion of active-material stack 504 that resides between them.

The widths of optical-mode portions 214A and 214B and the spacing between them are based upon widths w7 and w8 and the sub-layer configurations of coupling waveguide 502 and active-material stack 504.

In some embodiments, coupling waveguide 502 and active-material stack 504 are configured such that optical mode 214 includes a third optical-mode portion that is located in silicon device layer 206.

Figure 5B:
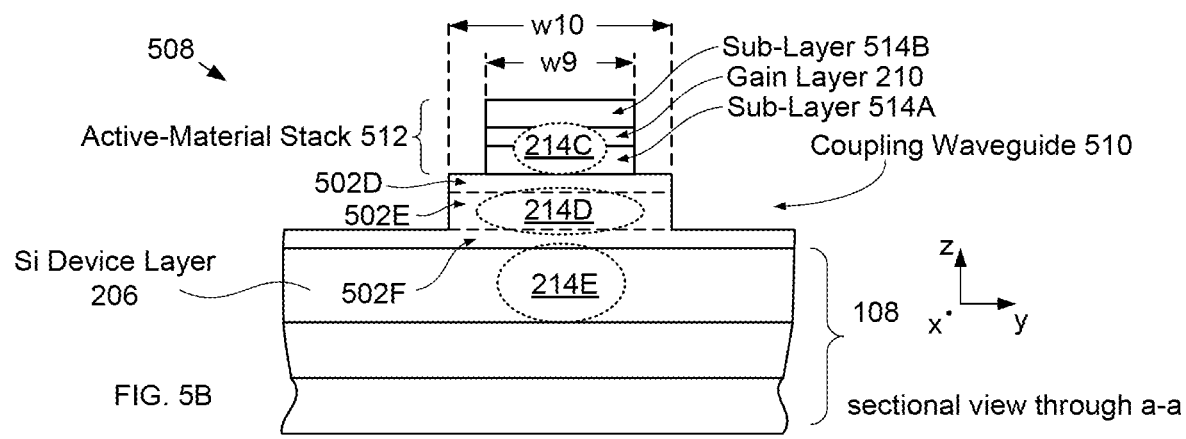
FIG. 5B depicts a schematic drawing of a sectional view of another alternative optically active waveguide in accordance with the present disclosure.

FIG. 5B depicts a schematic drawing of a sectional view of another alternative optically active waveguide in accordance with the present disclosure. The sectional view depicted in FIG. 5B is taken through a region analogous to that intersected by line a-a shown in FIG. 1. OA waveguide 508 is analogous to OA waveguide 500; however, in OA waveguide 508, coupling waveguide 502 and active-material stack 504 are configured to split the optical energy of optical mode 214 into three discontinuous optical-mode portions—optical-mode portions 214C, 214D, and 214E.

Coupling waveguide 510 is analogous to coupling waveguide 502; however, coupling waveguide 510 has width w10 and includes sub-layers 502D, 502E, and 502F, where each of sub-layers 502D and 502F has a refractive index that is lower than that of sub-layer 502E. As a result, sub-layers 502D and 502F function as lower and upper cladding layers, respectively, that substantially confine the bulk of the optical energy of optical-mode portion 214D to sub-layer 502E.

Active-material stack 512 is analogous to active-material stack 504; however, active-material stack 512 has width w9 and includes sub-layers 514A and 514B, each of which has a refractive index that is lower than that of gain layer 210. As a result, sub-layers 514A and 514B function as upper and lower cladding layers, respectively, that substantially confine the bulk of the optical energy of optical-mode portion 214C to the portion of active-material stack 512 that resides between them.

In the depicted example, coupling waveguide 510 and active-material stack 512 are further configured to give rise to additional optical-mode portion 214E, which is discontinuous with optical-mode portions 214C and 214D and substantially confined to silicon device layer 206.

As a result, each of coupling waveguide 510, active-material stack 512, and silicon device layer 206 partially supports optical mode 214 by supporting a different one of its optical-mode portions. The widths of optical-mode portions 214C, 214D, and 214E, as well as the spacing between them, are based upon widths w9 and w10 and the sub-layer configurations of coupling waveguide 510 and active-material stack 512.

In some embodiments, coupling layer 208 is configured such that optical mode 214 is split into discontinuous optical-mode portions in transition region 104, with one of the optical-mode portions being located in passive waveguide 116 and another optical-mode portion is located in silicon device layer 206.

Figure 6:
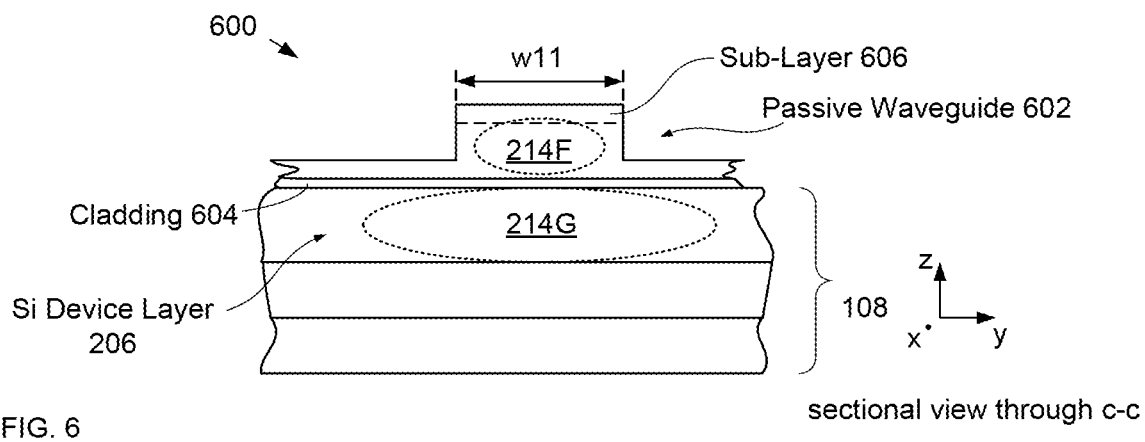
FIG. 6 depicts a schematic drawing of a sectional view of an alternative transition region in accordance with the present disclosure.

FIG. 6 depicts a schematic drawing of a sectional view of an alternative transition region in accordance with the present disclosure. The sectional view depicted in FIG. 6 is taken through a region analogous to that intersected by line c-c shown in FIG. 1. Transition region 600 includes substrate 108, passive waveguide 602, and cladding layer 604. Transition region 600 is analogous to transition region 104 described above; however, in transition region 600, optical mode 214 includes discontinuous optical-mode portions 214E and 214F, which reside in passive waveguide 602 and silicon device layer 206, respectively.

Passive waveguide 602 is analogous to passive waveguide 116; however, passive waveguide 602 includes sub-layer 606, which has a refractive index that is higher than the remainder of the passive waveguide.

Cladding 604 is a thin layer of material suitable for substantially blocking the passage of optical energy of light signal 120 between passive waveguide 116 and silicon device layer 206. In the depicted example, cladding 604 is a layer of silicon dioxide having a thickness of approximately 100 nm; however, it will be clear to one skilled in the art, after reading this Specification, how to specify, make, and use alternative embodiments wherein cladding 604 comprises a different material and/or has a different thickness.

As noted above, passive waveguide 602, cladding 604 and sub-layer 606 are configured such that they collectively support optical mode 214, which includes discontinuous optical-mode portions 214F and 214G, which are located in passive waveguide 116 and silicon device layer 206, respectively (i.e., passive waveguide 116 partially supports optical mode 214 by supporting optical-mode portion 214F and silicon device layer 206 partially supports optical mode 214 by supporting optical-mode portion 214G). The shapes, vertical positions, and separation between optical-mode portions 214F and 214G are based on the values of w11 that location.

Figure 7:
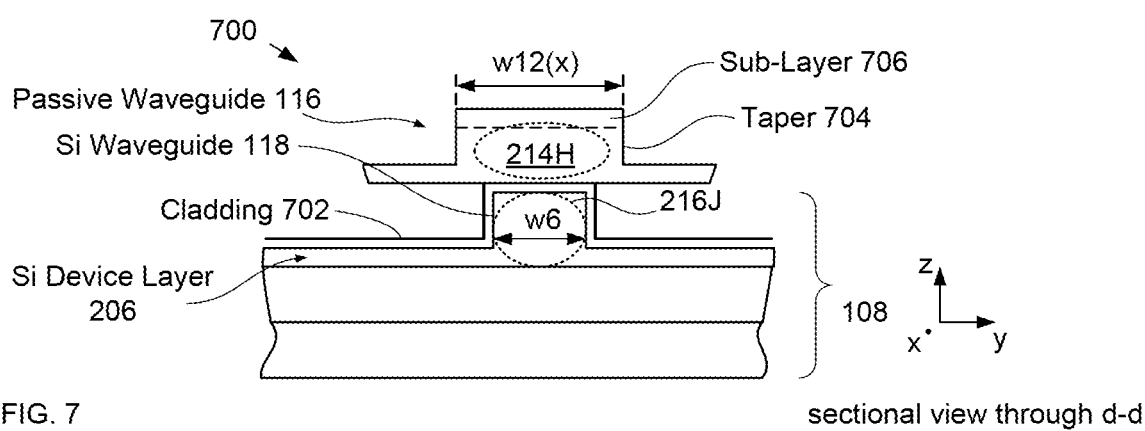
FIG. 7 depicts a schematic drawing of a sectional view of an alternative embodiment of a coupler for optically coupling a passive waveguide and a silicon waveguide in accordance with the present disclosure.

FIG. 7 depicts a schematic drawing of a sectional view of an alternative embodiment of a coupler for optically coupling a passive waveguide and a silicon waveguide in accordance with the present disclosure. The sectional view depicted in FIG. 7 is taken through a region analogous to that intersected by line d-d shown in FIG. 1. Coupler 700 includes substrate 108, silicon waveguide 118, cladding 702, and taper 704.

Cladding 702 is analogous to cladding 604.

Taper 704 is analogous to taper 126-3; however, taper 704 has width w12(x) along length L3 and includes sub-layer 706, which has a refractive index that is higher than the remainder of the taper. As a result, sub-layer 706 serves to confine optical energy of light signal 120 to the region of taper 704 located between cladding 702 and sub-layer 706.

By virtue of cladding 702 and sub-layer 706, optical mode 214 includes discontinuous optical-mode portions 214H and 214J, which are located in and supported by silicon waveguide 118 and taper 704, respectively. As a result, each of silicon waveguide 118 and taper 704 partially supports optical mode 214. The shapes, vertical positions, and separation between optical-mode portions 214H and 214J at any location along length L3 are based on the values of w12(x) and w6 at that location and the configuration of taper 704 and sub-layer 706.

In some embodiments, light signal 120 is optically coupled between passive waveguide 116 and silicon waveguide 118 via a turning reflector and vertical grating coupler.

FIG. 8 depicts a schematic drawing of a cross-sectional view of yet another alternative coupler in accordance with the present disclosure. Coupler 800 includes reflector 802 and vertical grating coupler 804.

Reflector 802 is an angled facet formed in passive waveguide 116. Reflector 802 is configured to receive light signal 120 propagating along longitudinal axis A1 of the passive waveguide and redirect it along a direction that is substantially normal to axis A1. In some embodiments, reflector 802 includes one or more surface layers (e.g., metals, dielectrics, etc.) for improving its reflectivity for light signal 120.

Grating 804 is a vertical grating coupler formed in silicon waveguide 118 and configured to receive light signal 120 from reflector 802 and redirect it along longitudinal axis A2 of the silicon waveguide.

As will be apparent to one skilled in the art, a vertical grating coupler typically has a range of angles at which light signal 120 can be received and successfully coupled into a waveguide. As a result, reflector 802 can be configured to redirect the light signal along any angle within the acceptance range of grating 804.

In some embodiments, grating 804 is formed in passive waveguide 116 and reflector 802 is formed in silicon waveguide 118.

In some embodiments, silicon waveguide includes an output port comprising a reflector configured to launch light signal 120 out of the plane of the silicon waveguide as a free-space signal.

FIGS. 9A and 9B depict schematic drawings of cross-sectional views of alternative output ports in accordance with the present disclosure. Each of ports 900 and 902 include reflector 904, which is formed in silicon waveguide 118.

Reflector 904 is analogous to reflector 802 described above; however, reflector 904 is formed in silicon waveguide 118 to redirect light signal 120 as indicated.

Port 900 includes reflector 904 and facet 906. Facet 906 is formed in silicon waveguide 118 such that light signal 120 is launched into free space and received by reflector 904. Reflector 904 is configured to redirect free-space light signal 120 away from handle substrate 202.

Port 902 includes reflector 904 is configured to launch light signal 120 as a free-space signal directed toward substrate 908.

Substrate 908 is analogous to substrate 108 described above; however, it is preferable that substrate 908 comprise a material that is substantially transparent and non-absorptive for the wavelengths of light signal 120 so that the light signal can pass completely through the substrate with little or no attenuation.

While it is preferable in most applications to optically couple light signal 120 between OA waveguide 110 and silicon waveguide 118, in some embodiments, the light signal is provided to, or received from, an external device or system without being coupled into the silicon waveguide.

Figure 10:
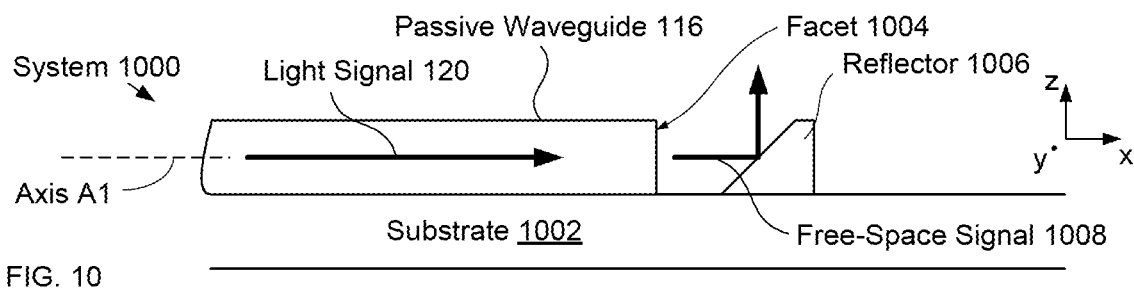
FIG. 10 depicts a schematic drawing of an alternative system in accordance with the present disclosure.

FIG. 10 depicts a schematic drawing of a cross-sectional view of an alternative system in accordance with the present disclosure. System 1000 is analogous to system 100; however, in system 1000, light signal 120 is launched into free space directly from passive waveguide 116. System 1000 is disposed on substrate 1002 and includes facet 1004 and bulk reflector 1006.

Substrate 1002 is a bulk-silicon substrate suitable for use in planar processing. In some embodiments, substrate 1002 is an SOI substrate.

Facet 1004 is an end facet formed in passive waveguide 116 in conventional fashion (e.g., by etching, dicing, partial dicing, etc.). At facet 1004, light signal 120 exits the passive waveguide as free-space signal 1008.

Reflector 1006 is analogous to reflector 804; however, reflector 1006 is a bulk reflector mounted on handle substrate 202 such that it receives free-space signal 1008 from passive waveguide 116. In some embodiments, reflector 1006 is formed in a region of coupling layer 208 outside of the area of passive waveguide 116.

In some embodiments, it is preferable to precisely locate a bulk optical element to receive free-space signal 1008 directly from passive waveguide 116.

Figure 11:
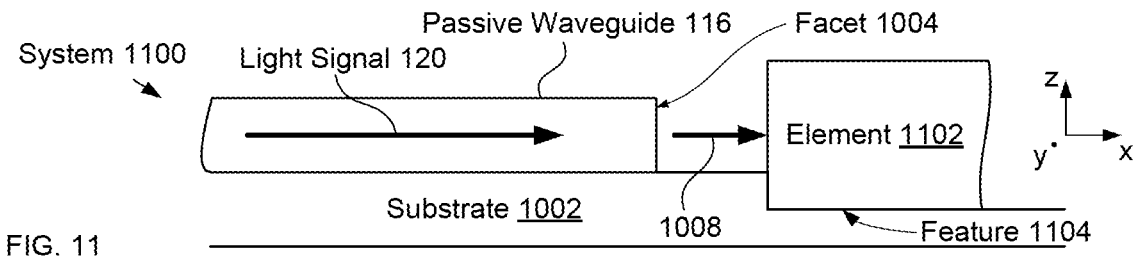
FIG. 11 depicts a schematic drawing of another alternative system in accordance with the present disclosure.

FIG. 11 depicts a schematic drawing of a cross-sectional view of another alternative system in accordance with the present disclosure. System 1100 is analogous to system 1000; however, system 1100 includes bulk optical element 1102 and alignment feature 1104. Element 1102 is precisely located on substrate 1002 by alignment feature 1104 such that it receives light signal 120 from passive waveguide 116.

In the depicted example, element 1102 is an optical fiber; however, element 1102 can include a wide range of device and systems without departing from the scope of the present disclosure. Devices and systems suitable for use in element 1102 include, without limitation, optical fibers, PICs, photodetectors, light sources (edge-emitting lasers, vertical-cavity surface-emitting lasers (VCSELs), light-emitting diodes, integrated-optics systems, planar-lightwave circuits (PLCs), and the like.

Alignment feature 1104 is a channel etched in substrate 1002 via conventional methods (e.g., reactive-ion etching, crystallographic-dependent etching, ion milling, laser-assisted etching, etc.) such that its depth aligns the core of element 1102 with passive waveguide 116. In some embodiments, alignment feature 1104 includes at least one projection disposed on the top surface of substrate 1002 (or silicon device layer 206 in embodiments where system 1100 is disposed on an SOI substrate, such as substrate 108), where the projection is configured to constrain element 1102 in at least one dimension.

In some embodiments, it is desirable to provide an optical element that is affixed to or formed in or on a surface of the substrate on which an integrated-optics system is disposed.

Figure 12:
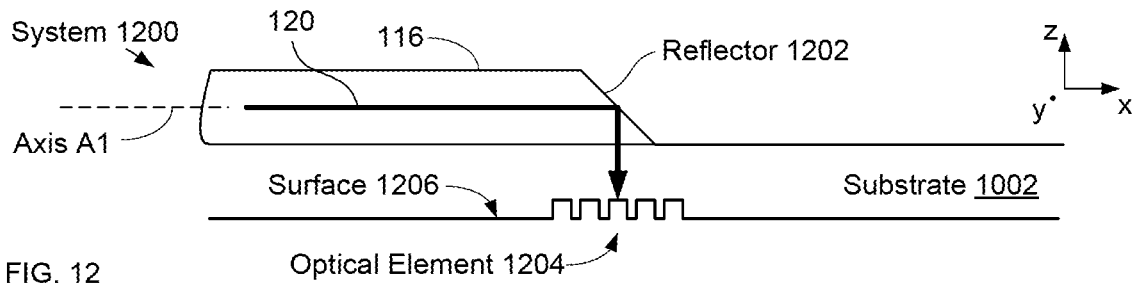
FIG. 12 depicts a schematic drawing of a cross-sectional view of another alternative integrated-optics system in accordance with the present disclosure.

FIG. 12 depicts a schematic drawing of a cross-sectional view of another alternative integrated-optics system in accordance with the present disclosure. System 1200 is analogous to system 1000; however, system 1200 includes a reflector that is integrated in passive waveguide 116.

Reflector 1202 is an angled end facet of passive waveguide 116, where the angle of the reflector enables it to redirect light signal 120 downward through substrate 202.

In the depicted example, optical element 1204 is a diffraction grating formed by etching features into surface 1206 of substrate 1002. In some embodiments, optical element 1204 is a bulk element or device that is affixed to surface 1206 in conventional fashion.

In some embodiments, optical element 1204 is an optical element other than a diffraction grating, such as a refractive lens, a hologram, a blazed grating, a Fresnel lens, and the like. In such embodiments, optical element 1204 is a discrete optical device, such as a photodetector, light source (e.g., VCSEL, LED, etc.), and the like.

Figure 13:
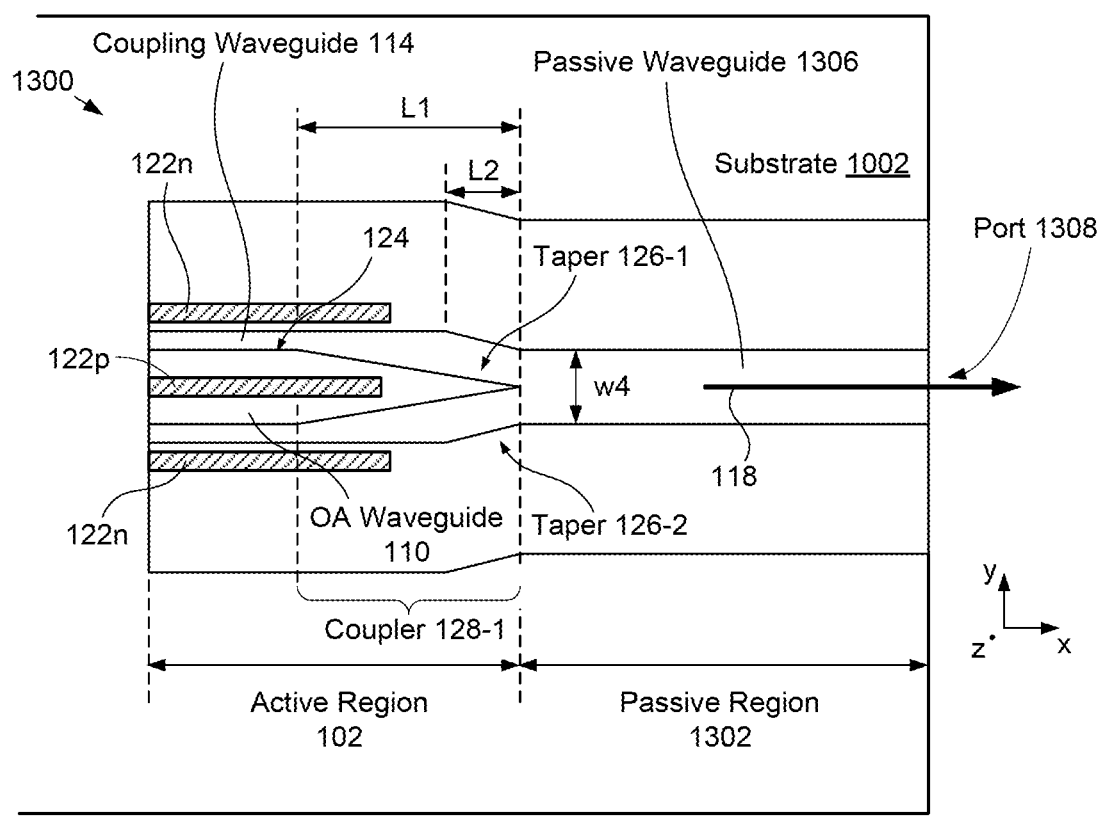
FIG. 13 depicts a schematic drawing of a top view of an alternative integrated-optics system in accordance with the present disclosure.

FIG. 13 depicts a schematic drawing of a top view of an alternative integrated-optics system in accordance with the present disclosure. System 1300 is analogous to system 100 described above; however, OA waveguide 110 is not optically coupled with a silicon waveguide in system 1300. System 1300 includes OA waveguide 110 and passive waveguide 1304, which is disposed on substrate 1002 in passive region 1302.

Passive waveguide 1306 is analogous to passive waveguide 116 described above; however, passive waveguide 1306 includes port 1308 rather than taper 126-3.

As a result, OA waveguide 110 can be optically coupled with one or more external devices and/or systems, such as optical fibers, bulk-optics elements, planar-lightwave circuits, photonic integrated circuits, etc.

It is to be understood that the disclosure teaches only examples of embodiment in accordance with the present disclosures and that many variations of these embodiments can easily be devised by those skilled in the art after reading this disclosure and that the scope of the present invention is to be determined by the following claims.

What is claimed is:
1. A method for forming an integrated-optics system on a first substrate, wherein the method includes:
   epitaxially growing a coupling layer on the first substrate;
   epitaxially growing an active-material stack on the coupling layer;

patterning the coupling layer and the active-material stack to define an optically active (OA) waveguide disposed on a first layer in a first region, the first layer comprising single-crystal silicon, wherein the OA waveguide comprises:
  (i) a coupling waveguide that includes a first segment of the coupling layer; and
  (ii) the active-material stack disposed on the coupling waveguide such that the active-material stack and the coupling waveguide collectively support at least a portion of an optical mode of a light signal;
  wherein, at each location within the first region, the active-material stack has a first lateral dimension and the coupling waveguide has a second lateral dimension; and
  wherein at least one of the shape and vertical position of the optical mode at each location within the first region is based on at least one of the first width and the second width;
forming a plurality of electrical contacts that are operatively coupled with the active-material stack in at least a portion of the first region; and
forming a first waveguide in a second region, wherein the first waveguide is a passive waveguide configured to support at least a portion of the optical mode, and wherein the first waveguide has a first core that comprises a second segment of the coupling layer, and further wherein the second segment abuts the first segment such that the first waveguide is optically coupled with the first OA waveguide.

2. The method of claim 1 further comprising providing the first substrate as a bulk single-crystal-silicon substrate that includes the first layer.

3. The method of claim 1 wherein the OA waveguide is formed such that, in the first region, the optical mode extends over a continuous area that includes at least a portion of the active-material stack and at least a portion of the coupling waveguide.

4. The method of claim 3 wherein the OA waveguide is formed such that, in the first region, the continuous area further includes at least a portion of the first layer.

5. The method of claim 1 wherein the OA waveguide is formed such that, in the first region, the optical mode includes a first optical-mode portion and a second optical-mode portion, the first and second optical-mode portions being discontinuous, and wherein the active-material stack and the coupling waveguide are formed such that the first optical-mode portion is located in the active-material stack and the second optical-mode portion is located in the coupling waveguide.

6. The method of claim 5 wherein the OA waveguide is formed such that, in the first region, the optical mode further includes a third optical-mode portion that is located in the first layer, and wherein the first, second, and third optical-mode portions are discontinuous.

7. The method of claim 1 wherein the first substrate is provided as a silicon-on-insulator substrate that includes a handle substrate, a buried-oxide layer, and a device layer, and wherein the first layer is the device layer.

8. The method of claim 1 further comprising:
providing the first substrate as a silicon-on-insulator substrate that includes a handle substrate, a buried-oxide layer, and a device layer that comprises single-crystal silicon, wherein the device layer includes the first layer;
defining a second waveguide in a third region, the second waveguide having a second core comprising a segment of the device layer; and
optically coupling the OA waveguide and the second waveguide via the first waveguide.

9. The method of claim 1 wherein the OA waveguide is formed such that the active-material stack includes a gain layer comprising at least one quantum element that is selected from the group consisting of a quantum dot, a quantum well, a quantum-well layer, a quantum dash, and a quantum wire.

10. The method of claim 1 wherein the active-material stack is configured to enable formation of an OA device selected from the group consisting of a laser, an optical modulator, an optical amplifier, a variable optical attenuator, and a photodetector.

11. The method of claim 1 further comprising patterning the active-material stack in the first region such that the active-material stack has a first taper having a first length, wherein the first lateral dimension changes from a first width to a second width along the first length, and wherein at least one of the size and the vertical position of the optical mode in the OA waveguide at each location along the first length is based on the first lateral dimension at that location.

12. The method of claim 11 wherein the second width is equal to zero.

13. The method of claim 1 further comprising providing a first reflector that is disposed on the first substrate, the first reflector being configured to receive the light signal along a first direction and redirect the light signal along a second direction that is unaligned with the first direction.

14. The method of claim 13 further including:
providing an optical element located at a first surface of the first substrate, the first surface being distal to the first waveguide, wherein the optical element is selected from the group consisting of a lens, a diffraction element, a photodetector, a laser, a vertical-cavity surface-emitting laser (VCSEL), and a light-emitting diode; and
enabling optical coupling between the OA waveguide and the optical element via the reflector.

15. The method of claim 13 further comprising:
providing a second waveguide disposed on the first substrate; and
forming a vertical grating coupler configured to receive the light signal from the first reflector, the first reflector being located in one of the first waveguide and the second waveguide and the vertical grating coupler being located in the other one of the first waveguide and second waveguide.

16. The method of claim 13 further comprising forming the first reflector such that it is configured to receive the light signal from the first waveguide as a free-space light signal.

17. The method of claim 1 further comprising forming a first alignment feature that is configured to vertically position a first element relative to the first waveguide to enable the light signal to optically couple into the first element, wherein the first element is selected from the group consisting of an optical fiber, a surface waveguide, an optical detector, a laser, an optical amplifier, and a light-emitting diode.

18. The method of claim 1 wherein the OA waveguide is formed such that the coupling layer has a first sub-layer that has a first refractive index and a second sub-layer that has a second refractive index that is higher than the first refractive index, the second sub-layer being between the first sub-layer and the active-material stack, and wherein the active-material stack includes a third sub-layer that has a third refractive index that is lower than the second refractive index.

19. A method for forming an integrated-optics system on a first substrate, wherein the method includes:
(1) providing the first substrate such that it comprises a first layer comprising single-crystal silicon;
(2) epitaxially growing an active-material stack on a second substrate;
(3) epitaxially growing a coupling layer on the active-material stack, the coupling layer comprising a compound semiconductor;
(4) joining the coupling layer and a second layer disposed on the first substrate, wherein the second layer comprises a first material selected from the group consisting of single-crystal silicon, silicon oxides, silicon nitrides, and metals;
(5) removing the second substrate from the coupling layer and active material stack;
(6) patterning the coupling layer and the active-material stack to form an optically active (OA) waveguide disposed on the first layer in a first region, wherein the OA waveguide comprises the active-material stack and a coupling waveguide that includes a first segment of the coupling layer, and wherein the active-material stack and the coupling waveguide collectively support at least a portion of an optical mode of a light signal, and wherein, at each location within the first region, the active-material stack has a first lateral dimension and the coupling waveguide has a second lateral dimension, and further wherein at least one of the shape and vertical position of the optical mode at each location within the first region is based on at least one of the first width and the second width;
(7) forming a plurality of electrical contacts that are operatively coupled with the active-material stack; and
(8) forming a first passive waveguide in a second region, wherein the first passive waveguide is configured to support at least a portion of the optical mode, and wherein the first passive waveguide has a first core that comprises a second segment of the coupling layer, and further wherein the second segment abuts the first segment such that the first passive waveguide is optically coupled with the OA waveguide.

20. The method of claim 19 wherein the OA waveguide is formed such that the active-material stack includes a gain layer comprising at least one quantum element that is selected from the group consisting of a quantum dot, a quantum well, a quantum-well layer, a quantum dash, and a quantum wire.

21. The method of claim 19 wherein the OA waveguide supports the optical mode such that it extends over a continuous area that includes at least a portion of the active-material stack and at least a portion of the coupling waveguide.

22. The method of claim 21 wherein the OA waveguide is formed such that, in the first region, the continuous area further includes at least a portion of the first layer.

23. The method of claim 19 wherein the OA waveguide is formed such that, in the first region, the optical mode includes a first optical-mode portion and a second optical-mode portion, the first and second optical-mode portions being discontinuous, and wherein the active-material stack and the coupling waveguide are formed such that the first optical-mode portion is located in the active-material stack and the second optical-mode portion is located in the coupling waveguide.

24. The method of claim 23 wherein the OA waveguide is formed such that, in the first region, the optical mode further includes a third optical-mode portion that is located in the first layer, and wherein the first, second, and third optical-mode portions are discontinuous.

25. The method of claim 24 wherein the first substrate is provided as a silicon-on-insulator substrate that includes a handle substrate, a buried-oxide layer, and a device layer, and wherein the first layer is the device layer.

26. The method of claim 19 further comprising:
providing the first substrate as a silicon-on-insulator substrate that includes a handle substrate, a buried-oxide layer, and a device layer that comprises single-crystal silicon, wherein the device layer includes the first layer;
defining a second passive waveguide in a third region, the second passive waveguide having a second core comprising a segment of the device layer; and
optically coupling the OA waveguide and the second passive waveguide via the first passive waveguide.

27. The method of claim 19 further comprising patterning the active-material stack in the first region such that the active-material stack has a first taper having a first length, wherein the first lateral dimension changes from a first width to a second width along the first length, and wherein at least one of the size and the vertical position of the optical mode in the OA waveguide at each location along the first length is based on the first lateral dimension at that location.

28. The method of claim 27 wherein the second width is equal to zero.

29. The method of claim 19 further comprising providing a first reflector that is disposed on the first substrate, the first reflector being configured to receive the light signal along a first direction and redirect the light signal along a second direction that is unaligned with the first direction.

30. The method of claim 29 further including:
providing an optical element located at a first surface of the first substrate, the first surface being distal to the first waveguide, wherein the optical element is selected from the group consisting of a lens, a diffraction element, a photodetector, a laser, a vertical-cavity surface-emitting laser (VCSEL), and a light-emitting diode; and
enabling optical coupling between the OA waveguide and the optical element via the reflector.

31. The method of claim 29 further comprising:
providing a second passive waveguide disposed on the first substrate; and
forming a vertical grating coupler configured to receive the light signal from the first reflector, the first reflector being located in one of the first passive waveguide and the second passive waveguide and the vertical grating coupler being located in the other one of the first passive waveguide and second passive waveguide.

32. The method of claim 29 further comprising forming the first reflector such that it is configured to receive the light signal from the first passive waveguide as a free-space light signal.

33. The method of claim 19 further comprising forming a first alignment feature that is configured to vertically position a first element relative to the first passive waveguide to enable the light signal to optically couple into the first element, wherein the first element is selected from the group consisting of an optical fiber, a surface waveguide, an optical detector, a laser, an optical amplifier, and a light-emitting diode.

34. The method of claim 19 wherein the OA waveguide is formed such that the coupling layer has a first sub-layer that has a first refractive index and a second sub-layer that has a second refractive index that is higher than the first refractive index, the second sub-layer being between the first sub-layer and the active-material stack, and wherein the active-material stack includes a third sub-layer that has a third refractive index that is lower than the second refractive index.

35. A method for forming an integrated-optics system on a first substrate, wherein the method includes:

forming an optically active (OA) waveguide disposed on a first layer in a first region, the first layer comprising single-crystal silicon, wherein the OA waveguide comprises:
- (i) a coupling waveguide that includes a first segment of a coupling layer that comprises a compound semiconductor; and
- (ii) an active-material stack that is disposed on the coupling waveguide such that the active-material stack and the coupling waveguide collectively support at least a portion of an optical mode of a light signal;

wherein, at each location within the first region, the active-material stack has a first lateral dimension and the coupling waveguide has a second lateral dimension; and wherein at least one of the shape and vertical position of the optical mode at each location within the first region is based on at least one of the first width and the second width;

forming a first waveguide in a second region, wherein the first waveguide is a passive waveguide configured to support at least a portion of the optical mode, and wherein the first waveguide has a first core that comprises a second segment of the coupling layer, and further wherein the second segment abuts the first segment such that the first waveguide is optically coupled with the first OA waveguide;

providing a first reflector that is disposed on the first substrate, the first reflector being configured to receive the light signal along a first direction and redirect the light signal along a second direction that is unaligned with the first direction;

providing a second waveguide disposed on the first substrate; and forming a vertical grating coupler configured to receive the light signal from the first reflector, the first reflector being located in one of the first waveguide and the second waveguide and the vertical grating coupler being located in the other one of the first waveguide and second waveguide.

36. The method of claim 34 further comprising:

epitaxially growing the coupling layer on the first substrate;

epitaxially growing the active-material stack on the coupling layer;

patterning the coupling layer and the active-material stack in the first region; and forming a plurality of electrical contacts that are operatively coupled with the active-material stack in at least a portion of the first region.

37. The method of claim 34 further comprising:

epitaxially growing the coupling layer and the active-material stack on a second substrate;

joining the coupling layer and a second layer, the first substrate comprising the second layer, wherein the second layer comprises a first material selected from the group consisting of single-crystal silicon, silicon oxides, silicon nitrides, polymers, and metals;

patterning the coupling layer and the active-material stack in the first region; and forming a plurality of electrical contacts that are operatively coupled with the active-material stack.

* * * * *